US008694387B2

(12) United States Patent
Carnevali

(10) Patent No.: US 8,694,387 B2
(45) Date of Patent: Apr. 8, 2014

(54) GEOLOCALIZED INFORMATION DISTRIBUTION SYSTEMS AND METHODS

(75) Inventor: Giuseppe Carnevali, Genoa (IT)

(73) Assignee: Navionics SpA, Milan (IT)

( * ) Notice: Subject to any disclaimer, the term of this patent is extended or adjusted under 35 U.S.C. 154(b) by 19 days.

(21) Appl. No.: 13/273,762

(22) Filed: Oct. 14, 2011

(65) Prior Publication Data

US 2012/0215651 A1    Aug. 23, 2012

Related U.S. Application Data

(60) Provisional application No. 61/445,660, filed on Feb. 23, 2011.

(51) Int. Cl.
*G06Q 30/00* (2012.01)
(52) U.S. Cl.
USPC ............................................................ 705/26.1

(58) Field of Classification Search
USPC ............................................................ 705/26.1
See application file for complete search history.

(56) References Cited

U.S. PATENT DOCUMENTS

| 8,266,139 | B2 * | 9/2012 | Morris et al. | 707/722 |
| 2007/0239648 | A1 * | 10/2007 | Thota | 706/47 |
| 2011/0209201 | A1 * | 8/2011 | Chollat | 726/4 |
| 2012/0246177 | A1 * | 9/2012 | Perrow et al. | 707/750 |

* cited by examiner

*Primary Examiner* — Mila Airapetian
(74) *Attorney, Agent, or Firm* — Onello & Mello, LLP

(57) ABSTRACT

A method of providing published articles linked to geographical locations, the method including the steps of providing to a user a graphical user interface including a representation of a geographic area, providing selectable identifications of one or more remotely published articles relating to locations within the geographic area, receiving a selection of the one or more remotely published articles, facilitating transmission of the one or more remotely published articles to computer-readable memory, and facilitating display of the one or more remotely published articles.

56 Claims, 8 Drawing Sheets

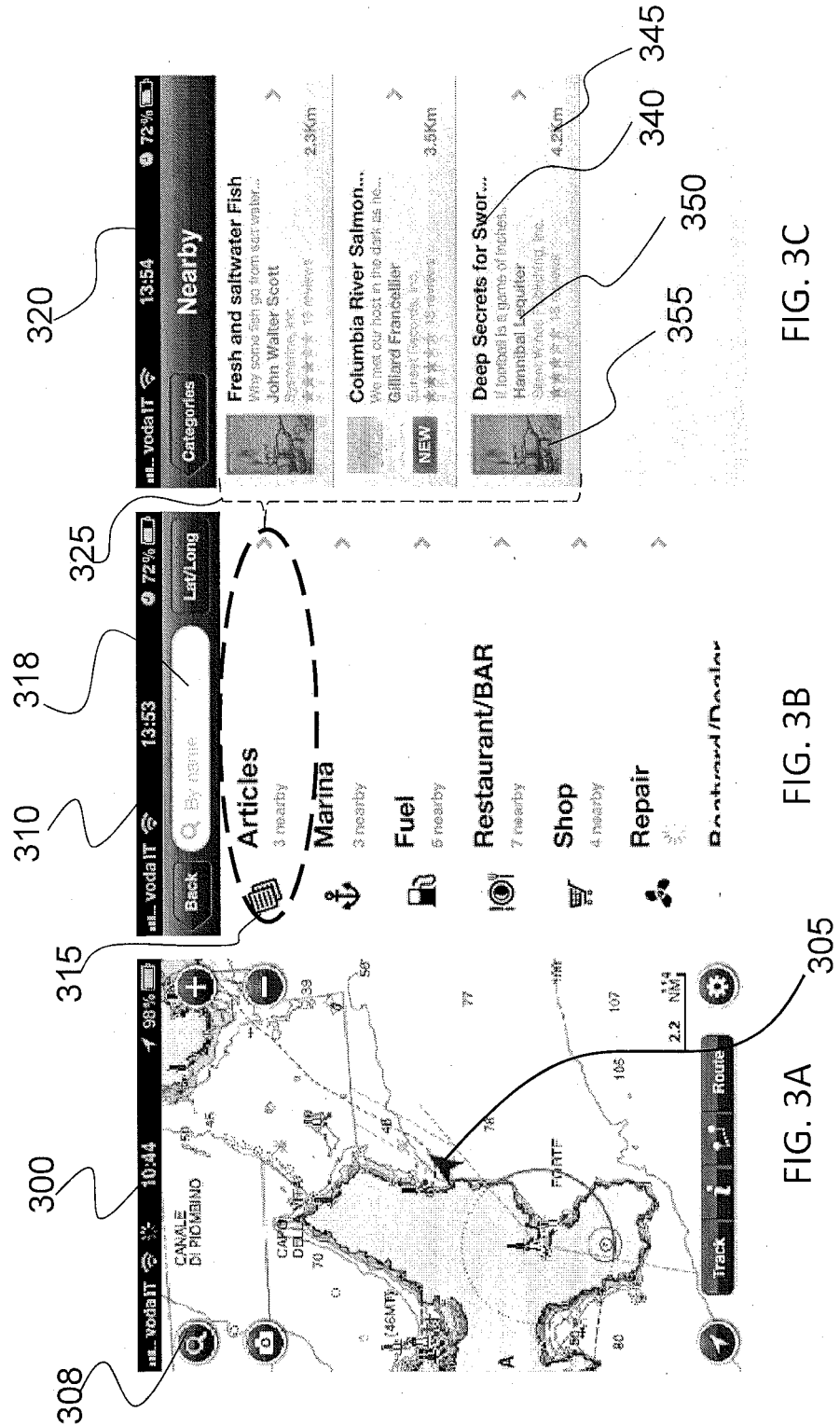

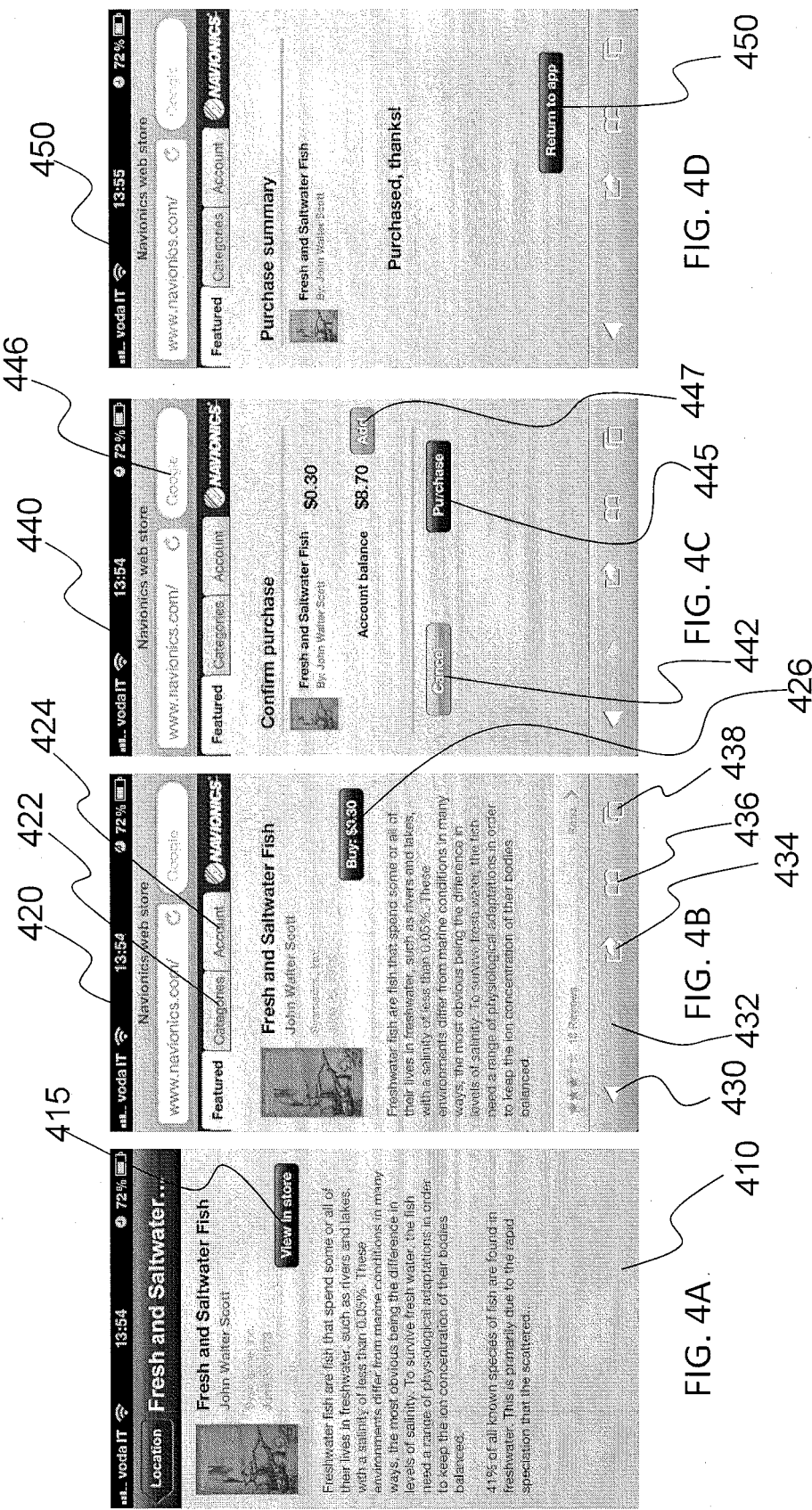

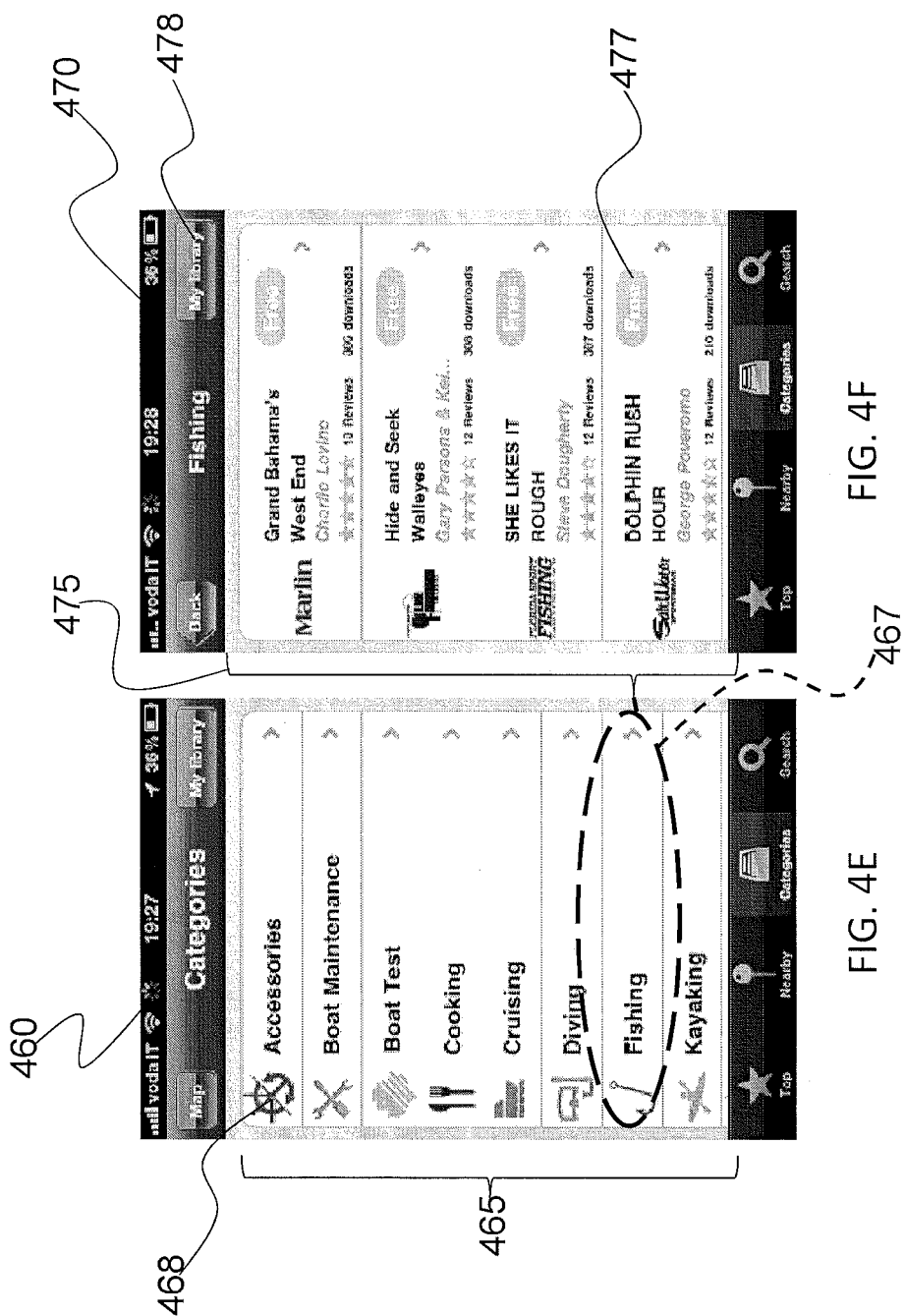

GEOLOCALIZED INFORMATION DISTRIBUTION SYSTEMS AND METHODS

RELATED APPLICATIONS

This application claims the benefit of U.S. Provisional Application No. 61/445,660, filed Feb. 23, 2011, the contents of which is herein incorporated by reference in its entirety.

FIELD

Embodiments of inventive concepts relate to methods and systems for distributing published content in relation to geographical locations, for example, geographic locations obtained from geographic positioning systems.

BACKGROUND

Global Positioning Systems (GPS) and related navigation software have greatly improved the ability of operators, including drivers, boaters, and other travelers with navigation. Various GPS systems have also improved the ability of travelers to find various types of services in local areas, including fuel stations, stores, and other types of services. However, obtaining further in-depth information, particularly published articles such as magazine articles, books, and newspaper articles, linked to particular geographic locations, including content requiring a paid fee or subscription, often requires one to independently seek this information such as by visiting a news/book stand and visiting online retail sites (e.g., Amazon Kindle (that is, an authorized distribution device, such as an Amazon Kindle)), etc. . . . .

SUMMARY

Embodiments of the inventive concepts described herein provide systems and methods for providing published content in relation to geographical locations, for example, geographic locations obtained from geographic positioning systems. In particular, embodiments provide more efficient ways of obtaining in-depth published content about local geographic areas during travel or while planning trips.

In an aspect of inventive concepts, a method of providing published articles linked to geographical locations is provided, the method including the steps of providing to a user a graphical user interface including a representation of a geographic area, providing selectable identifications of one or more remotely published articles relating to locations within the geographic area, receiving a selection of the one or more remotely published articles, facilitating transmission of the one or more remotely published articles to computer-readable memory, and facilitating display of the one or more remotely published articles.

In an embodiment, the method further comprises providing the physical location of the user within the geographic area. In an embodiment, providing the physical location of the user is performed through a geographic positioning device. In an embodiment, the geographic positioning device is at least one of a GPS locating system and cellular locating system. In an embodiment, providing to a user a graphical user interface comprises providing navigation within the geographic area through the geographic positioning device.

In an embodiment, the representation of the geographic area comprises a nautical chart representing a body of water.

In an embodiment, providing the selectable identifications of one or more remotely published articles comprises providing selectable identifications of one or more remotely published articles pertaining to at least one geographic location proximal to the physical location of the user. In an embodiment, the at least one geographic location proximal to the physical location of the user includes a radius about and inclusive of the physical location of the user.

In an embodiment, the one or more published articles are related to recreational activities. In an embodiment, the one or more published articles are related to at least one of boating, sailing, skiing, hiking, and bicycling. In an embodiment, the one or more published articles are related to the amenities pertaining to at least one of boating and fishing. In an embodiment, the one or more published articles are related to at least one of boating accessories, boat maintenance, boat testing, cooking, cruising, diving, fishing, kayaking, lifestyle, power boating, and sailing.

In an embodiment, the published articles are related to tourism. In an embodiment, the published articles are related to at least one of a tourist destination, shopping, and restaurants.

In an embodiment, the published articles are comprised of at least of one of a magazine article, newspaper article, and book.

In an embodiment, the step of providing selectable identifications of one or more remotely published articles comprises connecting to a remote server from which the identifications of one or more remotely published articles are retrieved.

In an embodiment, the server is configured to have an account for the user and is configured to permit the transmission and display of the selected one or more remotely published articles on a plurality of devices through a login into the account.

In an embodiment, the method further includes the step of providing a purchase option within the graphical user interface and facilitating payment by the user for the steps of facilitating transmission and display of the selected one or more remotely published articles.

In an embodiment, the step of facilitating transmission of the selected one or more remotely published articles comprises facilitating transmission of the selected one or more remotely published articles directly from the publisher.

In an embodiment, the step of facilitating display of the selected one or more remotely published articles comprises facilitating display of the selected one or more remotely published articles from within a web browser.

In an embodiment, the step of facilitating display of the selected one or more remotely published articles comprises facilitating display of the selected one or more remotely published articles from a mobile device.

In an embodiment, the step of facilitating display of the selected one or more remotely published articles comprises facilitating display of the selected one or more remotely published articles from at least one of a cell phone, a tablet, and an electronic reader.

In an embodiment, the step of facilitating display of the selected one or more remotely published articles comprises facilitating concurrent display of the selected one or more remotely published articles from a plurality of devices.

In an embodiment, the step of displaying transmission of the selected one or more remotely published articles comprises facilitating display of the selected one or more remotely published articles from within said graphical user interface.

In an embodiment, the graphical user interface permits the user to sort the selectable identifications of one or more remotely published articles by categories of article.

In an embodiment, the method including tracking the frequency of selections of particular publications and storing the frequency of selections in computer readable memory and wherein the wherein the step of providing selectable identifications of one or more remotely published articles comprises providing a list of the most frequently selected publications.

In an embodiment, the graphical user interface provides an option for identifying one or more remotely published articles as a favorite and storing the identifications as favorites in computer readable memory and wherein the step of providing selectable identifications of one or more remotely published articles comprises providing a list of the publications identified as favorites.

In an embodiment, the graphical user interface provides a field for inputting one or more search terms and wherein the method further comprises searching the one or more remotely published articles for the one or more search terms and identifying which of searched articles contains at least one or more of the one or more inputted search terms.

In an embodiment, the method includes a step of displaying at least one type of selectable graphical icon representing at least one type of article, wherein the icon is positioned and displayed within the representation of the geographic area. In an embodiment, the selectable graphical icon is positioned to be over or directly proximal to a particular area within the representation of the geographic area about which the corresponding article is written.

In an aspect of inventive concepts, a method of providing publications linked to geographical locations is provided, the method including the steps of providing to a user a graphical user interface including a representation of a geographic area, providing a geographic positioning system linked to the geographic area, providing navigation aids that are linked to the geographic area and data from the geographic positioning system, providing selectable identifications of one or more published articles relating to locations within the geographic area, receiving a selection of the one or more published articles, facilitating transmission of the one or more published articles to computer-readable memory, and facilitating display of the one or more published articles within a graphical user interface.

In an embodiment, the navigation aids display information about at least the geographic position within the geographic area, a direction of movement, a speed of movement, and an indicator of the direction of travel required to reach a pre-programmed destination.

In an embodiment, the selectable identifications of one or more published articles are related in particular to a destination selected within the graphical user interface.

In an embodiment, the method includes the step of providing a purchase option within the graphical user interface and facilitating payment by the user for the steps of facilitating transmission and display of the selected one or more remotely published articles.

In an embodiment, the published articles include at least of one of a magazine article, newspaper article, and book.

In an embodiment, the one or more published articles are related in particular to one of boat maintenance, boat test, cooking, cruising, diving, fishing, kayaking, lifestyle, power boating, and sailing.

In an aspect of inventive concepts, a system for providing published articles linked to geographical locations is provided, the system including a server configured to facilitate the display of remotely published articles within an application installed on a mobile device. The application is programmed in the computer readable memory of the mobile device to display a graphical user interface including a representation of a geographic area, display selectable identifications of one or more remotely published articles relating to locations within the geographic area, receive a selection from the user of the one or more remotely published articles, receive a transmission of the one or more selected articles and to store the transmission in the computer-readable memory of the mobile device, and display the selected published articles.

In an embodiment, the application is further programmed in the computer-readable memory of the mobile device to receive navigation data from a geographic positioning system. In an embodiment, the application is further programmed in the computer-readable memory of the mobile device to provide navigation aids that display information about at least the geographic position within the geographic area, a direction of movement, a speed of movement, and an indicator of a direction of travel to reach a pre-programmed destination. In an embodiment, the representation of the geographic area comprises a nautical chart representing a body of water and wherein providing navigation aids includes providing navigation aids relating to navigating the body of water.

In an embodiment, the selectable identifications of one or more remotely published articles are related to a destination selected within the graphical user interface. In an embodiment, the selectable identifications of the one or more published articles are related to the geographic areas proximal to the physical location of the user.

In an embodiment, the geographic positioning system is at least one of a GPS and cellular locating system.

In an embodiment, the application is further programmed in the computer-readable memory of the mobile device to provide a purchase option within the graphical user interface and to facilitate payment by the user for transmission and display of at least one of the selected remotely published articles.

In an embodiment, the remotely published articles are comprised of at least of one of a magazine article, newspaper article, and book.

In an embodiment, the remotely published articles pertain to at least one of boating and fishing.

In an embodiment, the remotely published articles are related to at least one of a tourist destination, shopping, and restaurants.

In an embodiment, the identifications of one or more remotely published articles are stored on the server and the application is further programmed in the computer-readable memory of the mobile device to download the identifications of the one or more remotely published articles from the server.

In an embodiment, the one or more remotely published articles are stored on the server and the application is further programmed in the computer-readable memory of the mobile device to download the one or more remotely published articles from the server.

In an embodiment, the server is further configured to have an account system for a user and is configured to permit the transmission and display of the selected one or more remotely published articles on a plurality of devices through a login in the account system.

In an embodiment, the application is further programmed in the computer-readable memory of the mobile device to display the selected published articles in a web browser.

In an embodiment, the application is further programmed in the computer-readable memory to provide a user selectable option for identifying one or more remotely published articles as favorites and wherein the application is programmed to provide selectable identifications of the favorite published articles within the graphical user interface.

In an embodiment, the graphical user interface is programmed for inputting one or more search terms from the user and wherein the application is programmed to search the one or more remotely published articles for one or more inputted search terms and identifying which of searched articles contains at least one or more of the inputted search terms.

In an embodiment, the graphical user interface is programmed to display at least one type of selectable graphical icon within the representation of the geographic area, each icon representing a remotely published article, and the position of the icon within the representation of the geographic area indicating a geographic area to which the article is linked.

BRIEF DESCRIPTION OF THE DRAWINGS

The foregoing and other objects, features and advantages of embodiments of the present inventive concepts will be apparent from the more particular description of embodiments, as illustrated in the accompanying drawings in which like reference characters refer to the same elements throughout the different views. The drawings are not necessarily to scale, emphasis instead being placed upon illustrating the principles of the inventive concepts in the drawings.

FIGS. 3A-3C are screen shots of an interface for listing and selecting published articles linked to a geographic area according to embodiments of present inventive concepts.

FIGS. 4A-4D are screen shots of previewing and purchasing a published article linked to a geographic area according to embodiments of present inventive concepts.

FIGS. 4E-4F are screen shots of an interface for viewing and selecting from categories and a categorized list, respectively, of published articles according to embodiments of present inventive concepts.

DETAILED DESCRIPTION

Figure 1:
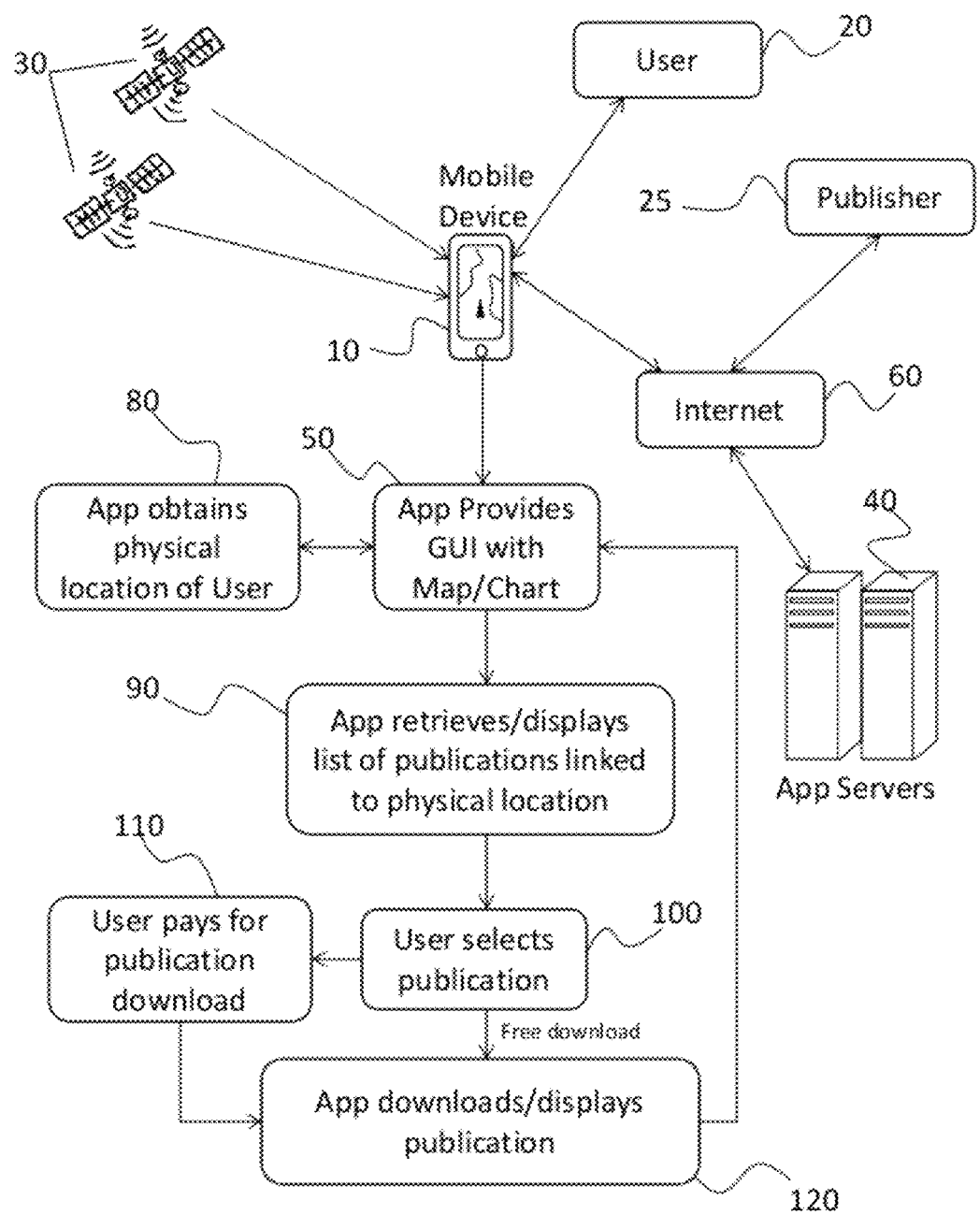
FIG. 1 is a high level block diagram of a system for obtaining publications linked to geographic locations in accordance with an embodiment of present inventive concepts.

The foregoing and other objects, features and advantages of the embodiments of inventive concepts will be apparent from the more particular description of embodiments of inventive concepts, as illustrated in the accompanying drawings in which like reference characters refer to the same parts throughout the different views. The drawings are not necessarily to scale, emphasis instead being placed upon illustrating the principles of the inventive concept in the drawings.

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these teems. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

FIG. 1 is a high level block diagram of a system for obtaining publications linked to geographic locations in accordance with an embodiment of present inventive concepts. In an embodiment, the system includes a mobile device 10 operated by a user 20 installed with an application (also referred to as an "App") that is programmed with a graphical user interface (GUI) to display a geographic area (e.g., a graphically rendered map or chart) as identified in a process step 50. In various embodiments, the mobile device 10 can be a "smart" phone, tablet, laptop, electronic plotter, or other mobile devices.

The App of the mobile device 10 is programmed to find and list published articles linked to a particular geographic area (as referred to in a process step 90). In an embodiment, the particular geographic area is an area proximate to the physical location of the mobile device 10 (e.g., within a certain radius of the physical location) or, for example, an area selected manually by the User 20. Determining the physical location of the mobile device, such as referred to in a process step 80, can be accomplished via a GPS (e.g., from GPS satellites 30) or through other methods including, for example, cellular signal positioning techniques that are known to those of ordinary skill in the art. From the list of published articles, the user can select an article to download and display, as referred to in a process step 100. In an embodiment, permission (e.g., a license) to download and display the publication can be purchased through the GUI programmed into the App or, in an embodiment, be purchased through a separate application (e.g., a web browser) to which the App can direct the User. In an embodiment, after downloading, the publication is displayed within and can be viewed from the App GUI (referred to in a process step 120). In an embodiment, the publication can be displayed in a separate application (e.g., a web browser or electronic reader). In an embodiment, the publication is downloaded to the mobile device (e.g., computer-readable memory) or an attached data storage device and made available on the device for later viewing without further downloading necessary. In an embodiment, the publication is stored on an external server from where the mobile device can access and display the publication.

In an embodiment, purchasing and downloading publications for display is managed via a server (e.g., of Servers 40) which, together with the mobile device 10, can be connected to and communicate via the Internet 60. In an embodiment, one or more Servers 40 are programmed to provide user accounts for particular users, who can log into and, through these accounts, purchase the ability to download and display the publications. In an embodiment, the listings of publications available for download are stored by and accessed through the server and, in a further embodiment, the publications themselves are stored by the server. In an embodiment, permissions to download publications and/or the publications themselves can be acquired directly through a publisher 25 or authorized distributors (e.g., Amazon Kindle, iTunes device (that is, authorized distribution devices such as Amazon Kindles or iTunes devices), etc.). In an embodiment, once purchased, viewing of a publication can be made accessible on more than one device such as, for example, different mobile devices and/or a desktop computer. In an embodiment, the App can operate on a non-mobile device such as a desktop computer.

In an embodiment, the publication is an article such as from a magazine or website, an article from a newspaper or news site, or a book. In an embodiment, the publications are related to boating accessories, boat maintenance, boat testing, cooking, cruising, diving, fishing, kayaking, lifestyle, power boating, and/or sailing. In an embodiment, the publications are related to any recreational activities or tourist activities and destinations including, for example, restaurants, inns, and other accommodations.

In various embodiments, the publications are linked or related to a geographical area by a reference to the geographical area within the publication, by a type of activity (e.g., sailing, fishing) that occurs in the geographic area, and/or by a predetermined or pre-established geographical relationship to the publication that is, for example, tracked/compiled by a server or other source.

Figure 2:
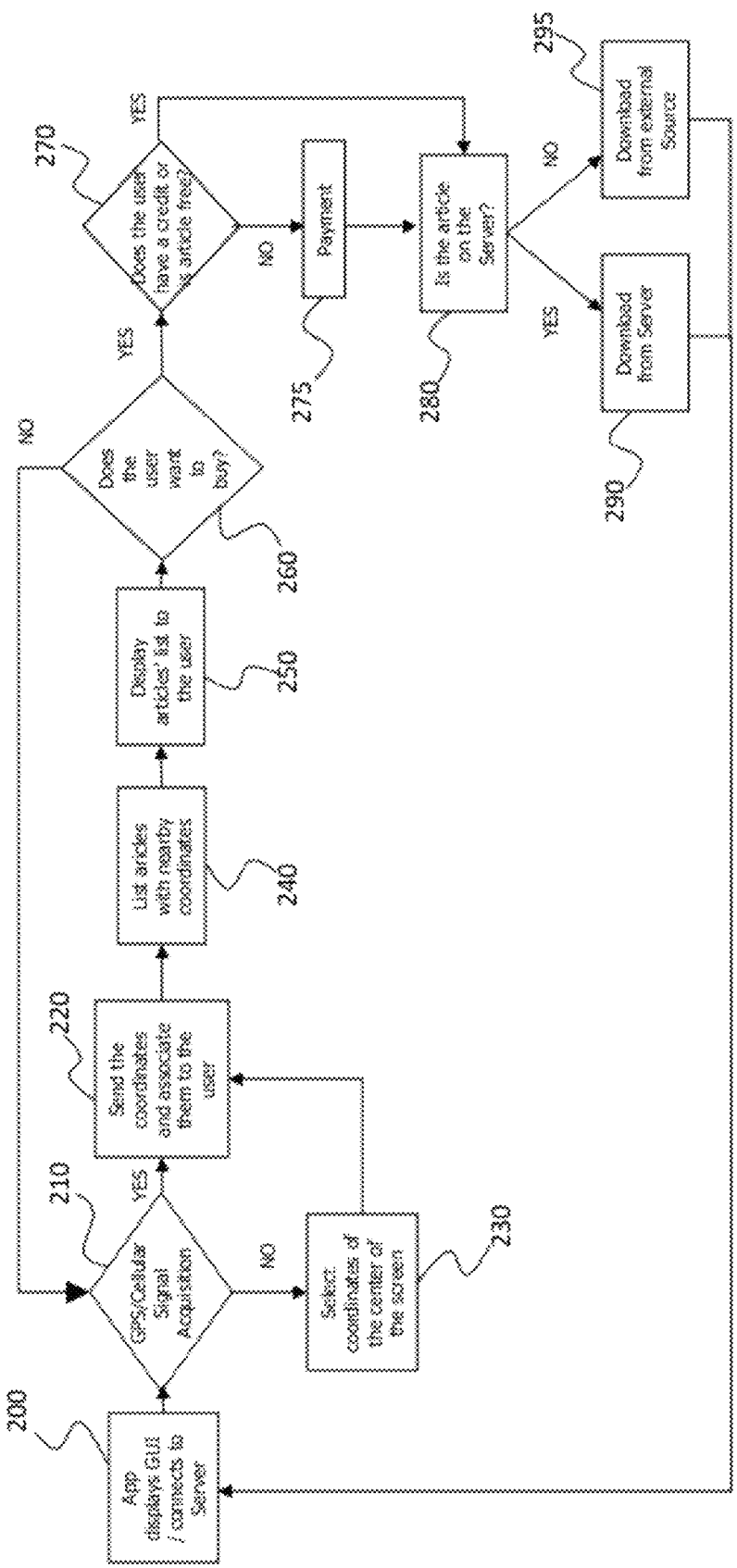
FIG. 2 is a process flow diagram of a system for obtaining publications linked to geographic locations according to an embodiment of present inventive concepts.

FIG. 2 is a process flow diagram of a system for obtaining publications linked to geographic locations according to an embodiment of present inventive concepts. In an embodiment, an exemplary process flow of an exemplary App includes the step 200 of the App displaying a GUI having a representation of a geographic area and attempting to establish a link between the App and a server (e.g., one of Servers 40 of FIG. 1). In a proceeding step 210, the App can query the host mobile device for the physical location of the device. If the App/Device can obtain a present location, the App can transmit the coordinates to the server, which will be used in connection with the established link to the server. Otherwise, the App can select default coordinates (e.g., last known location, last entered location) or query the user for a location, and send those coordinates to the server. In response, the server can transmit a list of publications geographically linked to the location of the device, for example, articles pertaining to geographic locations within a specific radius from the device or designated location or within an otherwise selected geographic region.

In an embodiment, as in a process step 260, the App then provides an option for the user to download and display a publication from the list of publications, some of which may be designated as available only with purchase. If the user selects a publication for download/display and the publication is designated as available only through purchase, and the publication has not already been determined by the App/server as being purchased by the user, the user will be prompted for payment and/or deduction from a credit balance established for the user in an account. In an embodiment, payment may be made with, for example, a credit or debit card, or similarly available payment services. In an embodiment, if the user has already been established by the App/server as having purchased the publication or the publication is otherwise freely downloadable, the user will not be prompted for payment.

In an embodiment, after permission for download/display has been established, the App will provide an option for the user to download the publication if not already downloaded on the device, and will proceed to download the publication from the server or other source as applicable (e.g., as referred to in steps 280, 290 and 295). In an embodiment, the App or a separate application may then display or otherwise facilitate display of the publication.

FIGS. 3A-3B are screen shots of an application interface for listing and selecting published articles linked to a geographic area according to embodiments of present inventive concepts. FIG. 3A is a screen shot 300 of a GUI showing a nautical chart including a geographic area represented by an arrow designator 305. A search button 308 can be clicked to conduct a search of items linked to the designated geographic area, including published articles. FIG. 3B is a screen shot 310 of a selectable menu list including an "Articles" selection option 315 for displaying searched and identified available articles linked to the geographic region indicated by designator 305, which can be displayed, for example, in response to clicking the search button 308 of FIG. 3A. The GUI of screen shot 310 further includes a search input field 318 in which a user can input search terms to be searched within the geographically linked items found through the application, including the names of published articles. FIG. 3C is a screen shot of a selectable menu list 325 of the geographically linked articles found through the application that can be displayed, for example, in response to selecting the "Articles" selection option 315 of FIG. 3B. Each menu item listed from the selectable menu list 325 displays an article title such as title 340, an article author such as author 350, and, if available, an associated icon such as icon 355 and a distance, such as distance 345, from the presently identified or selected geographic location within a geographic area about designator 305 of FIG. 3A. In an embodiment, a price (not shown) is also displayed within each applicable menu item if purchase is required for viewing the corresponding article.

FIGS. 4A-4D are screen shots of previewing and purchasing a published article linked to a geographic area according to embodiments of present inventive concepts. FIG. 4A is a screen shot 410 of a preview of a selected article, such as selected from the menu list 325 of FIG. 3C, with a button 415 that opens a GUI, such as a web page within a browser 420 represented in FIG. 4B and described below, for further options, including purchase, with respect to the selected article. FIG. 4B is a screen shot of a "store" website page facilitated by a web server (e.g., one of Servers 40 of FIG. 1) which provides tabbed options for purchasing selected articles and managing a user account. A button 426 previews the current price of the selected article and, upon clicking, continues the purchasing process, such as facilitated within the GUI 440 represented in FIG. 4C further described below. A selectable "Categories" menu option 422 directs the user to a GUI for viewing listings of identified articles sorted within various categories, such as represented within FIG. 4E further described below. An "Account" menu option directs the user to a GUI (not shown) for managing various account features including, for example, adding credit, and viewing prior purchases, account balances, and account statements, etc. . . . . . Buttons 430 and 432 allow for navigation between GUI screens shown in the order of viewing. Button 434 adds a bookmark for the presently open article preview screen 420. Button 436 directs the user to a GUI (not shown) for reviewing a selectable list of bookmarks. Button 438 resizes the presently open screen and allows the user to more easily navigate between other open screens.

FIG. 4C is a screen shot of a purchase finalization GUI 440 including an "Add" button 447 which directs the user to another GUI (not shown) for adding account value, a "Cancel" button 442 for canceling the current purchase process, and a "Purchase" button for finalizing the purchase of the article for download/viewing. FIG. 4D is a screen shot of a "Purchase Summary" screen which confirms the purchase of an article and may be presented in response to clicking the "Purchase" button 445 of FIG. 4C.

FIGS. 4E-4F are screen shots of an interface for viewing and selecting from categories and a categorized list, respectively, of published articles according to embodiments of present inventive concepts. FIG. 4E is a screen shot 460 of a selectable list 465 of various categories within which found articles can be sorted by. FIG. 4F is a screen shot of a selectable list 475 of found articles sorted by the "Fishing" category after selection of a Fishing category option 467 of FIG. 4E. A "Free" label 477 indicates that a selectable article is free for download/display. A "My library" button 478 directs the user to a GUI (not shown) including a selectable listing of already downloaded/purchased articles ready for display.

Figure 4G:
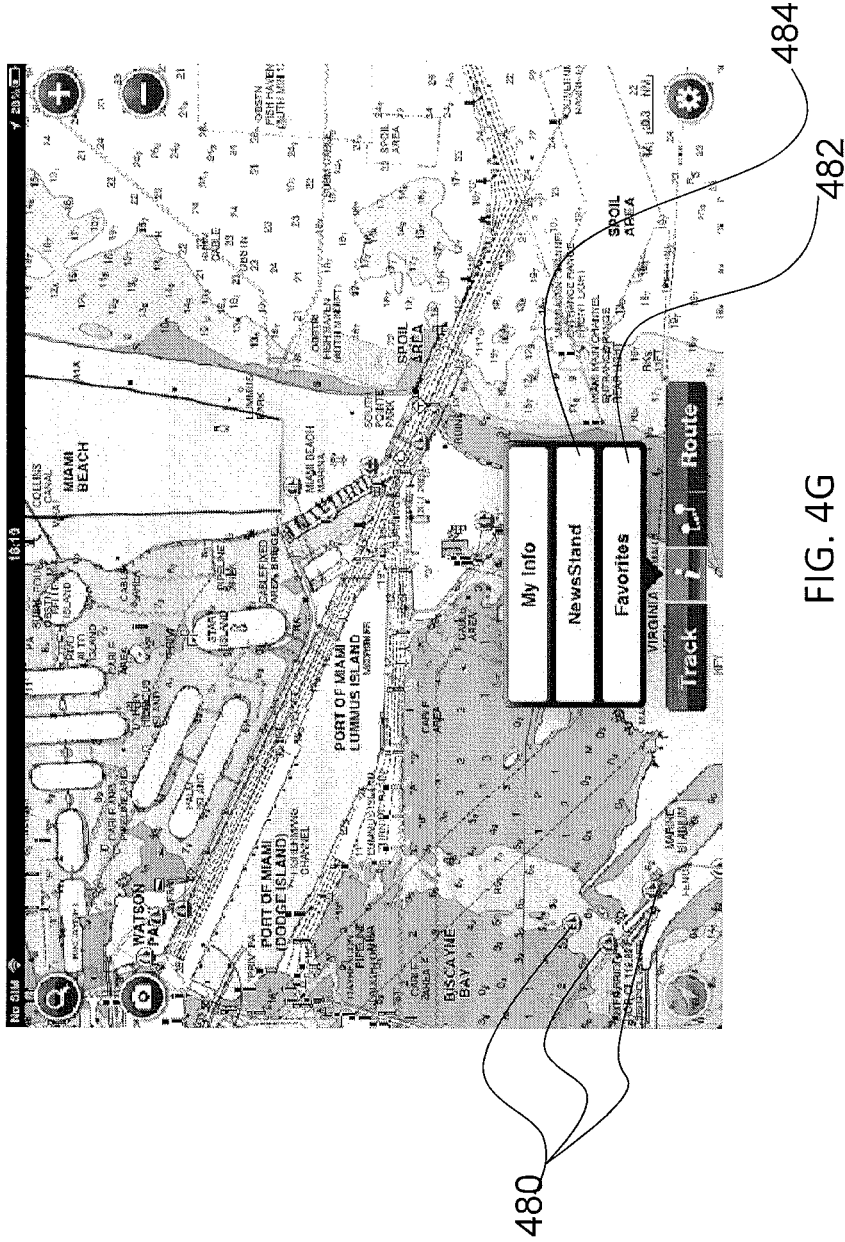
FIG. 4G is a screen shot of a nautical chart having icons representing publications and associated geographic locations according to an embodiment of present inventive concepts.

FIG. 4G is a screen shot of a nautical chart having icons 480 representing publications and associated geographic locations according to an embodiment of present inventive concepts. In an embodiment, placing a cursor over an icon and, for example, holding or clicking the cursor over the icon presents a brief summary view (not shown) of the publication which the icon represents and provides an option for downloading and viewing the full publication. In an embodiment, various types of icons (e.g., an icon 468 as shown in FIG. 4E) can identify different categories of publications. A "Newstand" button 484 can direct a user to a selectable list of published downloadable articles relating to the surrounding geographic area (e.g., the GUI of FIG. 3C). A "Favorites" button 482 can direct a user to a list of articles among those found relating to the geographic area and previously designated by the user as a "favorite" during prior operation of the system.

Figure 5:
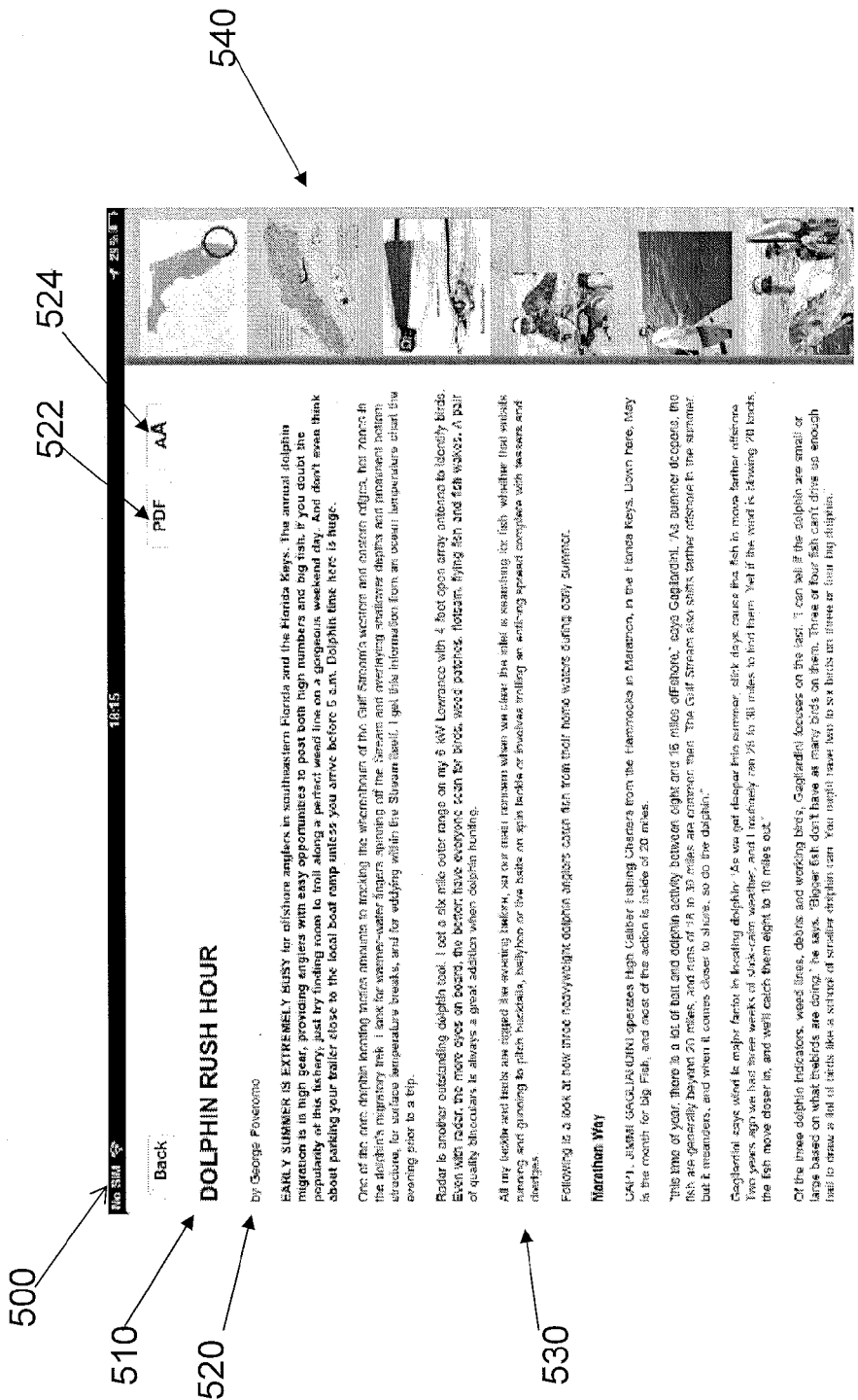
FIG. 5 is a screen shot of displaying a published article linked to a geographic area according to an embodiment of present inventive concepts.

FIG. 5 is a screen shot 500 of displaying a published article linked to a geographic area according to an embodiment of present inventive concepts. The presentation of the published article includes a title 510, an author 520, a body 530 of the article, and a view of images 540 related to the article. A "PDF" button 522 can direct the App to facilitate providing a .pdf formatted file of the article. A formatting button 524 can permit the user with options for formatting the presentation of the article. In various embodiments, options and ways of presenting an article within the application can be provided including the use of scroll bars, resizing, font sizes and types, multi-page views, etc. . . . . In an embodiment, the article is presented in a separate application including, for example, a web browser or an e-reader.

Figure 6:
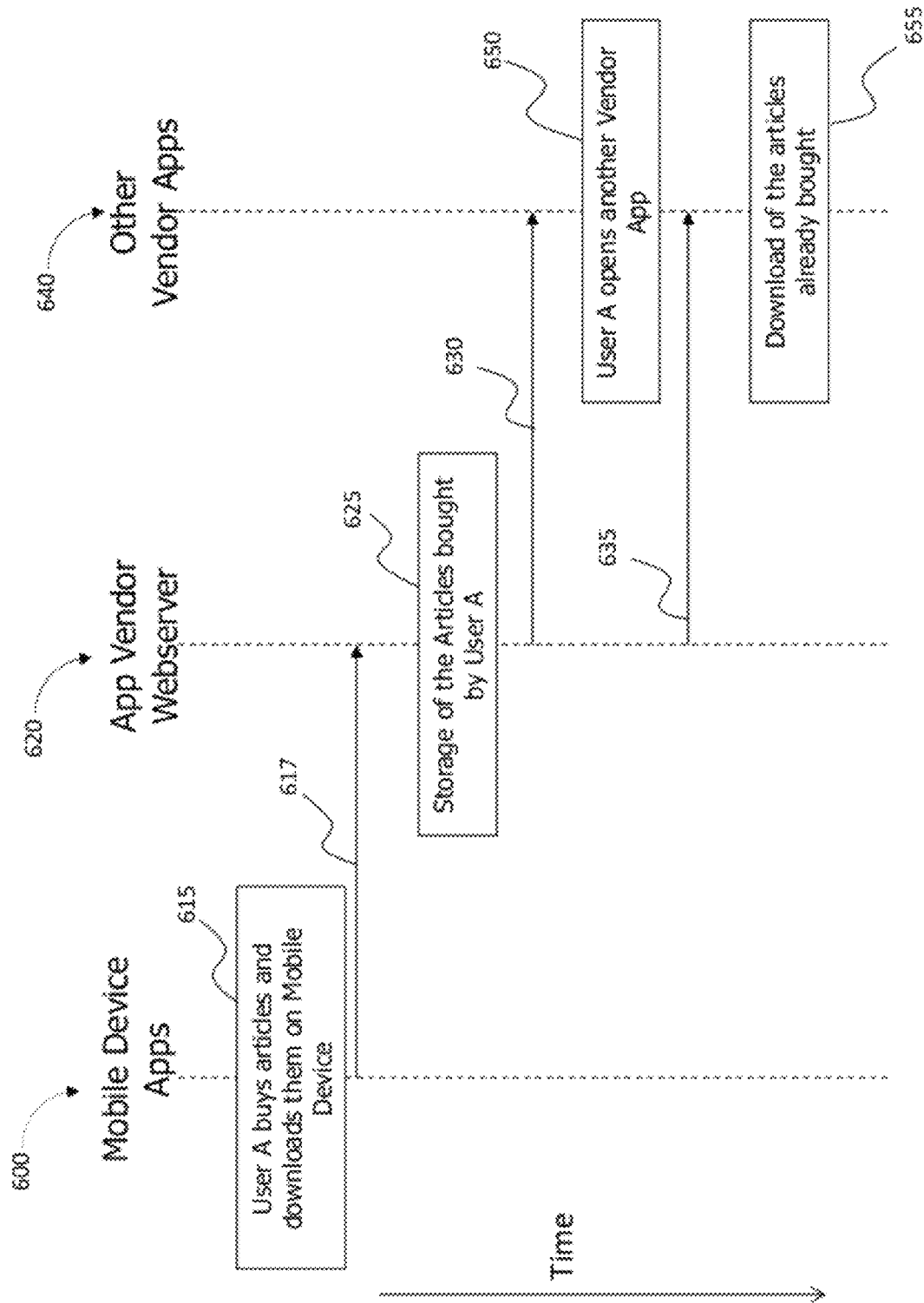
FIG. 6 is an event time flow diagram of a system for obtaining publications linked to geographic locations in accordance with an embodiment of present inventive concepts.

FIG. 6 is an event time flow diagram of a system for obtaining publications linked to geographic locations in accordance with an embodiment of present inventive concepts. The event time flow diagram includes events over a timeline 610 of Mobile Device Apps 600, a an App Vendor Webserver 620, and other Vendor Apps 640 in accordance with embodiments of inventive concepts. During an event 615, a User A purchases a publication such as in accordance with embodiments described above, after which time 617, the App Vendor Webserver stores (an event 625) the articles and/or order history pertaining to User A, after which time 630, User A can open (an event 650) other vendor applications on other devices, after which time 635, User A can download/display (an event 655) already purchased articles.

While embodiments of the inventive concepts have been particularly shown and described with references to embodiments thereof, it will be understood by those skilled in the art that various changes in form and details may be made herein without departing from the spirit and scope of the inventive concepts as defined by the appended claims.

I claim:

1. A method of providing published articles linked to geographical locations, the method comprising the steps of:
providing to a user a graphical user interface comprising a representation of a geographic area the representation including a nautical chart of a body of water;
providing selectable identifications of one or more conventionally published articles the contents of which relate to locations within the geographic area;
receiving a selection of the one or more conventionally published articles;
facilitating transmission of the one or more conventionally published articles to computer-readable memory; and
facilitating display of the one or more conventionally published articles.

2. The method of claim 1 wherein the method further comprises providing the physical location of the user within the geographic area.

3. The method of claim 2 wherein providing the physical location of the user is performed through a geographic positioning device.

4. The method of claim 3 wherein the geographic positioning device is at least one of a GPS locating system and cellular locating system.

5. The method of claim 2 wherein providing to a user a graphical user interface comprises providing navigation within the geographic area through the geographic positioning device.

6. The method of claim 1 wherein providing the selectable identifications of one or more conventionally published articles comprises providing selectable identifications of one or more conventionally published articles pertaining to at least one geographic location proximal to the physical location of the user.

7. The method of claim 1 wherein the at least one geographic location proximal to the physical location of the user includes a radius about and inclusive of the physical location of the user.

8. The method of claim 1 wherein the one or more published articles are related to recreational activities.

9. The method of claim 1 wherein the one or more published articles are related to at least one of boating, sailing, skiing, hiking, and bicycling.

10. The method of claim 8 wherein the one or more published articles are related to the amenities pertaining to at least one of boating and fishing.

11. The method of claim 9 wherein the one or more published articles are related to at least one of boating accessories, boat maintenance, boat testing, cooking, cruising, diving, fishing, kayaking, lifestyle, power boating, and sailing.

12. The method of claim 1 wherein the published articles are related to tourism.

13. The method of claim 12 wherein the published articles are related to at least one of a tourist destination, shopping, and restaurants.

14. The method of claim 1 wherein the published articles are comprised of at least of one of a magazine article, newspaper article, and book.

15. The method of claim 1 wherein the step of providing selectable identifications of one or more conventionally published articles comprises connecting to a remote server from which the identifications of one or more conventionally published articles are retrieved.

16. The method of claim 15 wherein the server is configured to have an account for the user and is configured to permit the transmission and display of the selected one or more conventionally published articles on a plurality of devices through a login into the account.

17. The method of claim 1 further comprising the step of providing a purchase option within the graphical user interface and facilitating payment by the user for the steps of facilitating transmission and display of the selected one or more published articles.

18. The method of claim 1 wherein the step of facilitating transmission of the selected one or more conventionally published articles comprises facilitating transmission of the selected one or more conventionally published articles directly from the publisher.

19. The method of claim 1 wherein the step of facilitating display of the selected one or more conventionally published articles comprises facilitating display of the selected one or more conventionally published articles from within a web browser.

20. The method of claim 1 wherein the step of facilitating display of the selected one or more conventionally published articles comprises facilitating display of the selected one or more conventionally published articles from a mobile device.

21. The method of claim 1 wherein the step of facilitating display of the selected one or more conventionally published articles comprises facilitating display of the selected one or more conventionally published articles from at least one of a cell phone, a tablet, and an electronic reader.

22. The method of claim 1 wherein the step of facilitating display of the selected one or more conventionally published articles comprises facilitating concurrent display of the selected one or more conventionally published articles from a plurality of devices.

23. The method of claim 1 wherein the step of displaying transmission of the selected one or more conventionally published articles comprises facilitating display of the selected one or more conventionally published articles from within said graphical user interface.

24. The method of claim 1 wherein the graphical user interface permits the user to sort the selectable identifications of one or more conventionally published articles by categories of article.

25. The method of claim 1 further comprising tracking the frequency of selections of particular publications and storing the frequency of selections in computer readable memory and wherein the step of providing selectable identifications of one or more conventionally published articles comprises providing a list of the most frequently selected publications.

26. The method of claim 1 wherein the graphical user interface provides an option for identifying one or more conventionally published articles as a favorite and storing the identifications as favorites in computer readable memory and wherein the step of providing selectable identifications of one or more conventionally published articles comprises providing a list of the publications identified as favorites.

27. The method of claim 1 wherein the graphical user interface provides a field for inputting one or more search terms and wherein the method further comprises searching the one or more conventionally published articles for the one or more search terms and identifying which of searched articles contains at least one or more of the one or more inputted search terms.

28. The method of claim 1 further comprising a step of displaying at least one type of selectable graphical icon representing at least one type of article, wherein the icon is positioned and displayed within the representation of the geographic area.

29. The method of claim 28 wherein the selectable graphical icon is positioned to be over or directly proximal to a particular area within the representation of the geographic area about which the corresponding article is written.

30. The method of claim 1 wherein the one or more conventionally published articles are related to the geographic area by at least one of reference in the published articles to the geographic area, an activity in the geographic area, or a pre-established relationship.

31. A method of providing publications linked to geographical locations, the method comprising the steps of:
providing to a user a graphical user interface comprising a representation of a geographic area, the representation including a nautical chart of a body of water;
providing a geographic positioning system linked to the geographic area;
providing navigation aids that are linked to the geographic area and data from the geographic positioning system;
providing selectable identifications of one or more conventionally published articles the contents of which relate to locations within the geographic area;
receiving a selection of the one or more published articles;
facilitating transmission of the one or more published articles to computer-readable memory; and
facilitating display of the one or more published articles within a graphical user interface.

32. The method of claim 31 wherein the navigation aids display information about at least the geographic position within the geographic area, a direction of movement, a speed of movement, and an indicator of the direction of travel required to reach a pre-programmed destination.

33. The method of claim 32 wherein the selectable identifications of one or more published articles are related in particular to a destination selected within the graphical user interface.

34. The method of claim 31 further comprising the step of providing a purchase option within the graphical user interface and facilitating payment by the user for the steps of facilitating transmission and display of the selected one or more conventionally published articles.

35. The method of claim 31 wherein the published articles are comprised of at least of one of a magazine article, newspaper article, and book.

36. The method of claim 31 wherein the one or more published articles are related in particular to one of boat maintenance, boat test, cooking, cruising, diving, fishing, kayaking, lifestyle, power boating, and sailing.

37. The method of claim 31 wherein the one or more publications are linked to the geographic area by at least one of a reference in the publication to the geographic area, an activity in the geographic area, and a pre-established relationship.

38. A system for providing published articles linked to geographical locations, the system comprising:
- a server configured to facilitate the display of conventionally published articles within an application installed on a mobile device, the application programmed in the computer readable memory of the mobile device to:
- display a graphical user interface comprising a representation of a geographic area including a nautical chart representing a body of water;
- display selectable identifications of one or more conventionally published articles the contents of which relate to locations within the geographic area;
- receive a selection from the user of the one or more conventionally published articles;
- receive a transmission of the one or more selected articles and to store the transmission in the computer-readable memory of the mobile device; and
- display the selected published articles.

39. The system of claim 38 wherein the application is further programmed in the computer-readable memory of the mobile device to receive navigation data from a geographic positioning system.

40. The system of claim 39 wherein the application is further programmed in the computer-readable memory of the mobile device to provide navigation aids that display information about at least the geographic position within the geographic area, a direction of movement, a speed of movement, and an indicator of a direction of travel to reach a pre-programmed destination.

41. The system of claim 40 wherein wherein providing navigation aids includes providing navigation aids relating to navigating the body of water.

42. The system of claim 38 wherein the selectable identifications of one or more conventionally published articles are related to a destination selected within the graphical user interface.

43. The system of claim 39 wherein the selectable identifications of the one or more published articles are related to the geographic areas proximal to the physical location of the user.

44. The system of claim 39 wherein the geographic positioning system is at least one of a GPS and cellular locating system.

45. The system of claim 38 wherein the application is further programmed in the computer-readable memory of the mobile device to provide a purchase option within the graphical user interface and to facilitate payment by the user for transmission and display of at least one of the selected conventionally published articles.

46. The system of claim 38 wherein the conventionally published articles are comprised of at least of one of a magazine article, newspaper article, and book.

47. The system of claim 46 wherein the conventionally published articles pertain to at least one of boating and fishing.

48. The system of claim 38 wherein the conventionally published articles are related to at least one of a tourist destination, shopping, and restaurants.

49. The system of claim 38 wherein the identifications of one or more conventionally published articles are stored on the server and the application is further programmed in the computer-readable memory of the mobile device to download the identifications of the one or more conventionally published articles from the server.

50. The system of claim 38 wherein the one or more conventionally published articles are stored on the server and the application is further programmed in the computer-readable memory of the mobile device to download the one or more remotely published articles from the server.

51. The system of claim 38 wherein the server is further configured to have an account system for a user and is configured to permit the transmission and display of the selected one or more conventionally published articles on a plurality of devices through a login in the account system.

52. The system of claim 38 wherein the application is further programmed in the computer-readable memory of the mobile device to display the selected published articles in a web browser.

53. The system of claim 38 wherein the application is further programmed in the computer-readable memory to provide a user selectable option for identifying one or more conventionally published articles as favorites and wherein the application is programmed to provide selectable identifications of the favorite published articles within the graphical user interface.

54. The system of claim 38 wherein the graphical user interface is programmed for inputting one or more search teens from the user and wherein the application is programmed to search the one or more conventionally published articles for one or more inputted search terms and identifying which of searched articles contains at least one or more of the inputted search terms.

55. The system of claim 38 wherein the graphical user interface is programmed to display at least one type of selectable graphical icon within the representation of the geographic area, each icon representing a conventionally published article, and the position of the icon within the representation of the geographic area indicating a geographic area to which the article is linked.

56. The system of claim 38 wherein the one or more conventionally published articles are linked to the geographic area by at least one of a reference in the published articles to the geographic area, an activity in the geographic area, and a pre-established relationship.

* * * * *

UNITED STATES PATENT AND TRADEMARK OFFICE
CERTIFICATE OF CORRECTION

PATENT NO. : 8,694,387 B2  
APPLICATION NO. : 13/273762  
DATED : April 8, 2014  
INVENTOR(S) : Giuseppe Carnevali Page 1 of 1

It is certified that error appears in the above-identified patent and that said Letters Patent is hereby corrected as shown below:

In the Claims

Claim 14, Column 11, line 7, delete the second instance of "of"

Claim 35, Column 12, line 57, delete the second instance of "of"

Claim 41, Column 13, line 31, delete the second instance of "wherein"

Claim 46, Column 13, line 52, delete the second instance of "of"

Claim 54, Column 14, line 35, delete "teens" and insert --terms--

Signed and Sealed this  
Sixteenth Day of September, 2014

Michelle K. Lee  
*Deputy Director of the United States Patent and Trademark Office*